Sept. 17, 1957     L. E. BRUSCH     2,806,326
MACHINE AND METHOD FOR MAKING MOSS POLES
Filed July 12, 1954     2 Sheets—Sheet 1
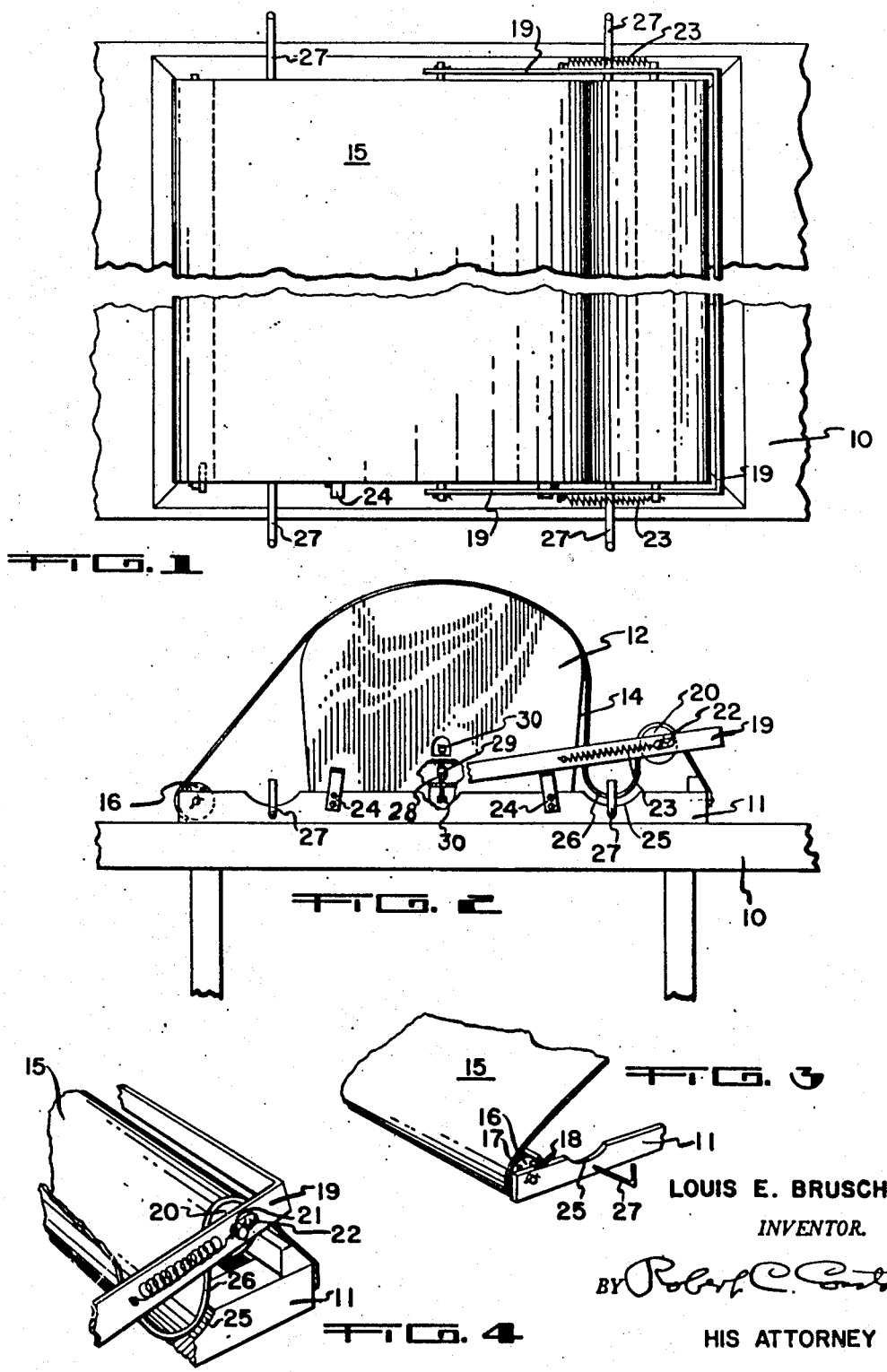
LOUIS E. BRUSCH
INVENTOR.
BY Robert C. _____
HIS ATTORNEY Sept. 17, 1957  L. E. BRUSCH  2,806,326
MACHINE AND METHOD FOR MAKING MOSS POLES
Filed July 12, 1954  2 Sheets-Sheet 2

INVENTOR.
LOUIS E. BRUSCH
BY Robert C. Comstock
ATTORNEY

United States Patent Office 2,806,326
Patented Sept. 17, 1957

2,806,326

MACHINE AND METHOD FOR MAKING MOSS POLES

Louis E. Brusch, Los Angeles, Calif.

Application July 12, 1954, Serial No. 442,517

5 Claims. (Cl. 47—58)

This invention relates to a machine and method for making moss poles.

In the growing of indoor plants, particularly philodendrons which are cultivated as upright planters, it is necessary that the plant have a source of water and food supply and also have an upright support around which to grow. This is customarily provided in the form of a moss pole.

In the past, such poles have been made by nursery workers or home owners in a haphazard manner. They comprise essentially a stick the desired length, around which is wrapped a quantity of moss. The moss is kept slightly moist and furnishes both food and water to the plant, as well as providing a support around which the plant can grow in the desired upright manner.

It is an object of my invention to provide a machine for making moss poles. My machine and the moss poles which it produces have numerous advantages over existing methods of forming moss poles and the moss poles now made. First, my machine is much faster and easier to operate than the present hand assembly methods in which each moss pole is separately formed. Second, the moss poles made by my machine are uniform in their construction, instead of being irregular and uncertain.

It is now the customary practice of nurseries to have their laborers construct moss poles. Even if spare time is utilized, this procedure is costly in both materials and labor. With my machine, moss poles can be made in mass production and sold to the nursery at less than the cost to the nursery of making its own moss poles.

It is among the objects of my invention to provide a machine for making moss poles which will make such mass production possible and which operates in a simple and efficient manner and which manufactures uniform and substantially perfect moss poles.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings:

Fig. 1 is a top plan view of my machine for making moss poles mounted on a table or work bench, with the same shown partly broken away;

Fig. 2 is a side elevational view of the same;

Fig. 3 is a perspective view of the stationary roller portion of my machine;

Fig. 4 is a perspective view of the movable roller portion of my machine.

Figure 5:
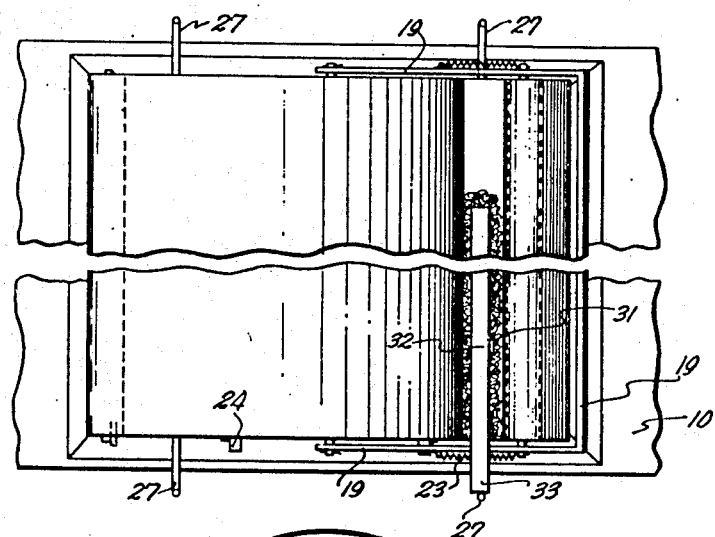
Fig. 5 is a top plan view of my machine with the pole and the first quantity of moss therein.
Figure 6:
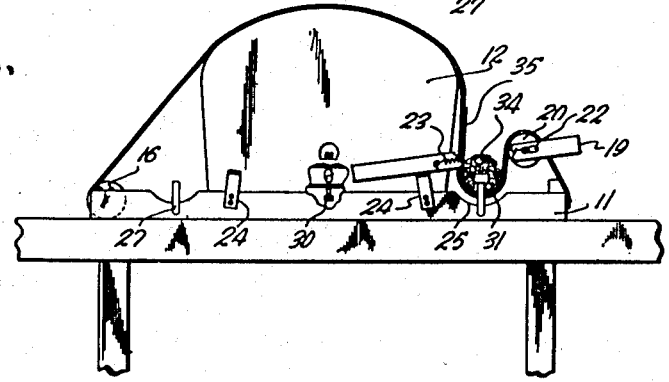
Fig. 6 is a side elevation of the machine with the pole, all of the moss, and the wire in place to start the winding.
Figure 7:
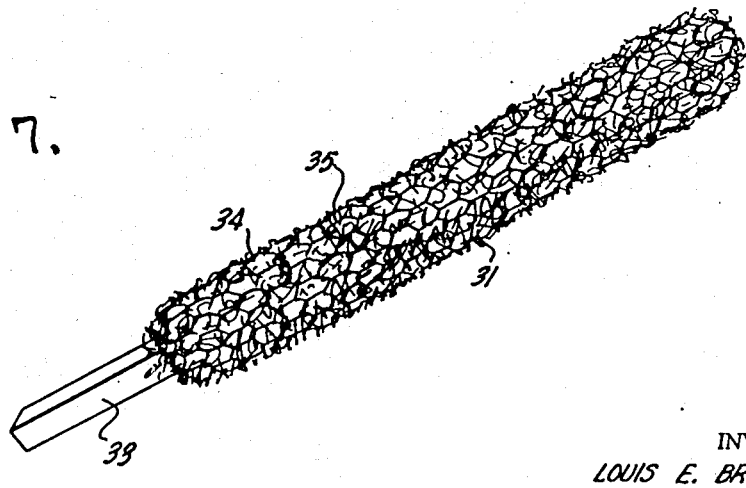
Fig. 7 is a perspective view of the finished moss pole.

A preferred embodiment which has been selected to illustrate my invention is preferably mounted on a table or work bench 10. The machine comprises a base 11, the bottom of which rests upon the top of bench 10. Extending upwardly from the center portion of the sides of base 11 are two side plates 12 of a roller plate 14, which is preferably formed of metal. Roller plate 14 extends substantially upwardly from one end of base 11, forms a curve and then extends substantially straight downwardly to base 11 on the opposite side of the center thereof. Roller plate 14 is only slightly smaller in width than base 11.

A wide belt 15, which is preferably formed of cloth impregnated with rubber, is attached at one end to the end of base 11 and extends across the top of roller plate 14 to the opposite end of base 11. A stationary roller 16 is mounted adjacent the opposite end of base 11, with its axle extending through openings in the sides of base 11. The axle of stationary roller 16 is provided with a plurality of openings 17 adjacent one end, in one of which a stop member 18 is inserted. Stop member 18 engages the top of base 11 to prevent rotary movement of stationary roller 16. The length of belt 15 may be controlled by moving stop member 18 to another opening 17 in order to change the rotary positioning of stationary roller 16.

A lever arm 19, which comprises three sides of a rectangle, is pivotally mounted along its open side adjacent the bottom center of side plates 12. Lever arm 19 is sufficiently large to clear the sides of base 11 and the top of roller plate 14.

A movable roller 20 is rotatably mounted adjacent the end of lever arm 19, extending parallel to the end of base 11. Roller 20 is mounted on a pair of pins 21, which extend through openings 22 in the sides of lever arm 19. Openings 22 are larger than pins 21. A pair of coil springs 23 are attached at one end to pins 21 and at the opposite end to the sides of lever arm 19 to exert pressure tending to move pins 21 and movable roller 20 toward the axis of lever arm 19.

A pair of brackets 24 are mounted on one side of base 11, extending upwardly and outwardly therefrom to limit the movement of lever arm 19. Base 11 is provided with an arcuate cut-out portion 25 on its opposite sides.

Belt 15 is provided with sufficient slack so that it forms a pocket or loop 26 between one side of roller plate 14 and movable roller 20, over which belt 15 extends.

In use, moss of the desired type is first soaked in water for several hours and then dried for several hours until it is almost completely dry. A first quantity 31 of moss is then placed in the bottom of loop 26, the amount being sufficient to fill the bottom of the loop. A stick 32 of wood, which is preferably redwood because of its non-rotting properties, is then inserted with one end projecting outwardly from the side of base 11. A plurality of measuring stops is provided, extending outwardly from the sides of base 11 beneath loop 26 and cut-out portions 25. One end of the stick is placed against the inside of measuring stop 27, while the other end is disposed within loop 26. This provides a portion 33 of the stick 32 adjacent one end which will remain uncovered with moss and which is inserted into the ground when the pole is used.

An additional quantity 34 of moss is then placed in loop 26 on top of the stick 32. A rectangular piece of hexagonal chicken wire 35 is then inserted so that it extends from the back of loop 26 upwardly along the end of roller plate 14 for a distance equal in length to that of the stick 32 and in height to greater than the circumference of the stick 32.

Lever arm 19 is then moved upwardly, causing the portion of belt 15 adjacent the outside of loop 26 to move toward roller plate 14. This movement continues as lever arm 19 is raised, causing the moss 31 and 34 within loop 26 to be wound around the stick 32 and the chicken wire 35 to be wound around the outside of the moss. This winding operation is completed by the time lever arm 19 reaches the top of roller plate 14, which forms a backing for the winding operation.

If short poles are made, it is possible to make two at one time by inserting one stick from each side of the machine. My machine is so formed that it can operate from either end and the winding operation can comprise either a halfway movement of lever arm 19 from one end of base 11 to the top of roller plate 14 and then back or a full movement from one end of base 11 to the other end of base 11. The movement of lever arm 19 may be performed manually or may be hydraulically operated.

Lever arm 19 is mounted on an axle 28, which extends transversely between side plates 12 beneath the center of roller plate 14. Axle 28 is mounted in a larger opening 29 and its positioning therein is controlled by a pair of adjusting screws 30 which are disposed beneath roller plate 14. A portion of Fig. 2 is broken away to show this construction. This provides a permanent adjustment of lever arm 19 with respect to the top of roller plate 14.

In use, if too large a quantity of moss is inserted in loop 26, it can be compensated for by the slight yielding of pivot pins 21 of movable roller 20 against the pressure of coil springs 23. The larger roll can then be accommodated without damaging or jamming the machine.

The measuring stops 27 are pivotally mounted, so that their upright portions can be swung to a horizontal or downward position, if desired.

If the user desires to make the moss poles green to improve their appearance, this can easily be accomplished with my device by spraying or painting dye on the top of belt 15. As the moss passes over the dye, it is colored green as the pole is formed.

I claim:

1. A machine for making moss poles having a base, a belt attached at its opposite ends adjacent the ends of said base, a roller plate extending upwardly from adjacent one end of said base, said roller plate having a slightly curved top, a lever arm pivotally mounted adjacent the center of said roller plate, a roller rotatably mounted adjacent the opposite end of said lever arm, said belt extending across said roller, said belt having sufficient slack to form a loop adjacent said roller, said loop adapted to receive a layer of moss, a moss pole and a second layer of moss within said loop and a piece of wire extending upwardly from said loop along the end of said roller plate, said lever arm adapted to be pivoted upwardly, lifting said roller beneath said belt, causing said loop to move upwardly and toward the center of said machine to wind said moss around said pole and said wire around said moss by the time said roller reaches the top of said roller plate to form a completed moss pole, and a measuring stop disposed adjacent one end of said loop, said measuring stop extending outwardly and upwardly from said base, said measuring stop adapted to position a moss pole within said loop so that one end thereof is free from moss for insertion into the ground.

2. A method of forming moss poles which comprises forming an elongated trough in an elongated belt, placing a first quantity of moss in the bottom of said trough so that said moss extends across the entire length of the trough, placing an elongated wooden pole on top of said first quantity of moss so that one end of said pole is disposed adjacent one edge of said belt while the opposite end of said pole protrudes substantially beyond the opposite edge of said belt, placing a second quantity of moss on top of said pole and first quantity of moss across the entire length of said trough, placing a substantially rectangular piece of open mesh wire so that it extends substantially upwardly from said moss and pole along one side of said loop, and moving the portion of said belt on the opposite side of said loop upwardly to wind both of said quantities of moss around said pole and to simultaneously wind said wire around the outside of said moss to provide a pole which is completely wrapped with moss held thereon by said wire except for the portion of said pole which protrudes beyond the edge of said belt, such portion being free from moss so as to be adapted for an insertion into the ground.

3. A method of forming moss poles which comprises forming an elongated trough in an elongated belt, placing a first quantity of moss in the bottom of said trough, placing an elongated pole longitudinally along said trough on top of said first quantity of moss so that one end of said pole protrudes substantially beyond the edge of said belt, placing a second quantity of moss on top of said pole and first quantity of moss to completely cover said pole, placing a piece of open mesh wire so that it extends adjacent said moss and pole along one side of said trough and moving the portion of said belt on the opposite side of said trough to wind both of said quantities of moss around said pole and to wind said wire around the outside of said moss to provide a pole which is completely enclosed with moss held thereon by said wire except for the portion of said pole which protrudes beyond the edge of said belt, such end being free from moss so as to be adapted for insertion into the ground.

4. A method of forming moss poles which comprises forming an elongated trough in an elongated belt, placing a first quantity of moss in the bottom of said trough, placing an elongated pole longitudinally along said trough on top of said first quantity of moss so that one end of said pole protrudes substantially beyond the edge of said moss, placing a second quantity of moss on top of said pole and first quantity of moss, placing a piece of open mesh wire so that it extends adjacent said moss and pole along one side of said trough, and moving the portion of said belt on the opposite side of said trough to wind both of said quantities of moss around said pole and to wind said wire around the outside of said moss to provide a pole which is completely enclosed with moss held thereon by said wire, except for the portion of said pole which protrudes beyond the edge of said moss, such end being free from moss so as to be adapted for insertion into the ground.

5. A method of forming moss poles which comprises forming an elongated trough in an elongated belt, placing a first quantity of moss in the bottom of said trough, placing an elongated pole longitudinally along said trough on top of said first quantity of moss, placing a second quantity of moss on top of said pole and first quantity of moss, placing a piece of open mesh wire so that it extends adjacent said moss and pole along one side of said trough, and moving the portion of said belt on the opposite side of said trough to wind both of said quantities of moss around said pole and to wind said wire around the outside of said moss to provide a pole which is substantially completely enclosed with moss held thereon by said wire.

References Cited in the file of this patent

UNITED STATES PATENTS

| | | |
|---|---|---|
| 1,024,028 | Sargent | Apr. 23, 1912 |
| 2,038,866 | Whittles | Apr. 28, 1936 |
| 2,048,042 | Wedge | July 21, 1936 |
| 2,239,445 | Martin | Apr. 22, 1941 |

FOREIGN PATENTS

| | | |
|---|---|---|
| 314,118 | Great Britain | June 24, 1929 |